US008512659B2

(12) United States Patent
Li et al.

(10) Patent No.: US 8,512,659 B2
(45) Date of Patent: Aug. 20, 2013

(54) IRON-CONTAINING ALUMINOSILICATE ZEOLITES AND METHODS OF MAKING AND USING SAME

(75) Inventors: Hong-Xin Li, Lansdale, PA (US); William E. Cormier, Harleysville, PA (US); Bjorn Moden, Glen Mills, PA (US)

(73) Assignee: PQ Corporation, Valley Forge, PA (US)

( * ) Notice: Subject to any disclaimer, the term of this patent is extended or adjusted under 35 U.S.C. 154(b) by 0 days.

(21) Appl. No.: 12/706,655

(22) Filed: Feb. 16, 2010

(65) Prior Publication Data

US 2010/0143224 A1 Jun. 10, 2010

Related U.S. Application Data

(62) Division of application No. 12/190,993, filed on Aug. 13, 2008.

(60) Provisional application No. 60/935,436, filed on Aug. 13, 2007.

(51) Int. Cl.
*B01D 53/56* (2006.01)

(52) U.S. Cl.
USPC .................................... 423/213.5; 423/239.2

(58) Field of Classification Search
USPC ............................................ 423/213.5, 239.2
See application file for complete search history.

(56) References Cited

U.S. PATENT DOCUMENTS

| 5,256,614 | A | 10/1993 | Itoh et al. | |
| 6,843,971 | B2 | 1/2005 | Schäfer-Sindlinger et al. | |
| 7,182,927 | B2 * | 2/2007 | Tran et al. | 423/237 |
| 2005/0271582 | A1 * | 12/2005 | Barea et al. | 423/709 |

FOREIGN PATENT DOCUMENTS

| DE | 281172 A | 8/1990 |
| JP | 2-659840 | * 9/1997 |

OTHER PUBLICATIONS

Torre-Abreu et al., "Characterisation of CuMFI catalysts by temperature programmed desorption of NO and temperature programmed reduction. effect of the zeolite Si/Al ratio and copper loading.", Applied Catalysis B: Environmental, vol. 12 (1997), p. 249-262.*
Huang et al., "Kinetics of selective catalytic reduction of NO with NH3 onf Fe-ZSM-5 catalyst", Applied catalysis A: General, vol. 235, Aug. 2002, p. 241-251.*
Brückner, A. et al., "E.p.r. Study on the Incorporation of Fe(III) Ions in ZSM-5 Zeolites in Dependence on the Preparation Conditions," Zeolites, 1992, vol. 12, April/May, 380-385.
Komatsu, Takayuki et al., "$Cu^{2+}$-Exchanged MFI-ferrisilicate Catalysts for the Reduction of Nitric Oxide with Ammonia," J. Chem. Soc., Faraday Trans., 1988, 94(7), 949-953.
Pérez-Ramirez, J. et al., "Evolution of Isomorphously Substituted Iron Zeolites During Activation: Comparison of Fe-beta and Fe-ZSM-5," Journal of Catalysis 232, 2005, 318-334.
Uddin, Azhar MD. et al., "Selective Catalytic Reduction of Nitric Oxide With Ammonia on MFI-Type Ferrisilicate," Journal of the Chemical Society, Faraday Transactions, 91, Sep. 21, 1995, No. 18, 3275-3279.
Wu, Peng et al., "Isomorphous Substitution of $Fe^{3+}$ in the Framework of Aluminosilicate Mordenite by Hydrothermal Synthesis," Microporous and Mesoporous Materials 20, 1998, 139-147.
International Search Report for Application No. PCT/US2008/009653 dated Feb. 27, 2009.

* cited by examiner

*Primary Examiner* — Elizabeth Wood
(74) *Attorney, Agent, or Firm* — O'Brien Jones, PLLC

(57) ABSTRACT

There is disclosed iron-containing aluminosilicate zeolites having both framework iron and iron cations on the ion-exchange sites. There is also disclosed a direct synthesis method of making an iron-containing aluminosilicate zeolite, which does not require the use of an intermediate step, such as ion-exchange or impregnation. In addition, there is disclosed a method of using the iron-containing aluminosilicate zeolite disclosed herein in a selective catalytic reduction reaction, typically in the presence of ammonia, to reduce or remove nitric oxides from exhaust emissions.

16 Claims, 5 Drawing Sheets

IRON-CONTAINING ALUMINOSILICATE ZEOLITES AND METHODS OF MAKING AND USING SAME

This is a division of Application No. 12/190,993, filed Aug. 13, 2008, which claims the benefit of domestic priority to U.S. Provisional Patent Application No. 60/935,436, filed Aug. 13, 2007, all of which are incorporated herein by reference.

The present invention relates to a method of directly synthesizing iron-containing aluminosilicate zeolites. The present disclosure also relates to iron-containing aluminosilicate zeolites, wherein the structures of the zeolite has both framework iron and iron cations on the ion-exchange sites, as well as methods of using such zeolites, including for selective catalytic reduction (SCR) of nitrogen oxides (NOx) in exhaust gases.

Nitric oxides ($NO_x$) have long been known to be polluting gases, principally by reason of their corrosive action. In fact, they are the primary reason for the cause of acid rain. A major contributor of pollution by $NO_x$'s is their emission in the exhaust gases of diesel automobiles and stationary sources such as coal-fired power plants and turbines. To avoid these harmful emissions, SCR is employed and involves the use of zeolitic catalysts in converting $NO_x$ to nitrogen and water.

Until the present invention, aluminosilicate zeolites for such applications were made by doping with a metal by ion-exchange or impregnation. Drawbacks associated with traditional metal doping of a zeolite include the necessity of a separate, additional step in the manufacture of a zeolite, and the difficulty in controlling the metal loading within the zeolite using ion-exchange or impregnation.

For example, U.S. Pat. No. 4,961,917 discloses the use of metal promoted (Fe and Cu) zeolites for reduction of NOx with ammonia. The zeolite disclosed therein has a silica to alumina ration (SAR) of at least about 10, a pore diameter of at least 7 Angstroms, and is selected from the group consisting of USY, Beta, and ZSM-20. As described in the examples therein, Beta zeolite was synthesized, calcined, ion-exchanged with $NH_4NO_3$, and then ion-exchanged with Fe or Cu.

U.S. Pat. No. 5,451,387 discloses the use of Fe-containing ZSM-5 zeolites for NOx reduction with ammonia, where iron is introduced into ZSM-5 zeolites by ion-exchange with ferrous salts. The zeolite disclosed therein has a SAR of at least 5 and a pore diameter of less than about 7 Angstroms.

U.S. Pat. Nos. 6,689,709 and 7,118,722 disclose stabilized Fe-promoted zeolites for NOx reduction. The zeolites are selected from USY, Beta, and ZSM-20 types and have a pore diameter of at least about 7 Angstroms. The Beta zeolites described therein are first steamed at high temperature and then ion-exchanged with iron sulphate solution.

U.S. Pat. No. 6,890,501 discloses a process for simultaneously removing NOx and $N_2O$ with ammonia using Beta zeolite loaded with iron and having a SAR ranging between 8 and 100. The Beta zeolite disclosed therein was prepared by ion-exchange or impregnation with $Fe(NO_3)_3$. Additionally, it teaches that the iron incorporated into the zeolite network during synthesis does not provide any catalytic activity.

The characterization of Fe-ZSM-5 zeolite, which has iron substituted in the zeolite framework rather than aluminum, is reported in Journal of Physical Chemistry, vol. 89, pp. 1569-71 (1985). The preparation of ferrisilicate molecular sieves, which are described as analogs to the ZSM-5 zeolites, is reported in Journal of Catalysis, vol. 100, no. 2, pp. 555-7 (1986).

U.S. Pat. No. 4,952,385 discloses a process for preparing an aluminum-free ferrisilicate ZSM-5 zeolite and that such a zeolite is useful in Fischer-Tropsch synthesis to directly convert mixtures of carbon monoxide and hydrogen to hydrocarbons. Finally, preparation and characterization of substantially aluminum-free ferrisilicate mordenite is reported in Zeolites, vol. 11, no. 1, pp. 42-7 (1991).

Despite the abundance of prior art in this area, the art is silent on methods of making zeolites containing transition metals that do not require some intermediate step, such as ion-exchange or impregnation, or an additional step, such as steam treatment, to extract the transition metal from the zeolite framework when made by direct synthesis. Thus, there is a need for an improved and simplified method of making metal-containing aluminosilicates that does not require ion-exchange or impregnation or extraction of the cations from the zeolite framework after direct synthesis and the products thereof. To that end, the Inventors have discovered iron-containing aluminosilicate zeolites wherein the structure of the zeolite has both framework iron and iron cations on the ion-exchange sites, and methods of directly synthesizing these iron-containing aluminosilicate zeolites.

SUMMARY

There is disclosed an iron-containing aluminosilicate zeolite wherein the structure of the zeolite has both framework iron and iron cations on the ion-exchange sites.

There is further disclosed a method of making an iron-containing aluminosilicate zeolite, comprising: mixing a source of alumina, a source of silica, optionally an organic structural directing agent, and with an iron constituent to form an iron containing synthesis mixture; and performing at least one heating step on the iron containing mixture to form an aluminosilicate zeolite wherein the structure of the zeolite has both framework iron and iron cations on the ion-exchange sites.

As the inventive method does not require calcining prior to metal addition, it is possible to coat a monolith with an uncalcined iron-containing aluminosilicate zeolite described herein, and calcine the entire coated structure. Thus, there is also disclosed a monolith coated with an iron-containing aluminosilicate zeolite wherein the structure of the zeolite has both framework iron and iron cations on the ion-exchange sites.

In addition, there is disclosed a method of using the iron-containing aluminosilicate zeolite disclosed herein in an SCR reaction, typically in the presence of ammonia or source thereof, such as a urea solution.

The accompanying drawings, which are incorporated in and constitute a part of this specification, illustrate several embodiments of the invention and, together with the description, serve to explain the principles of the invention.

Figure 1:
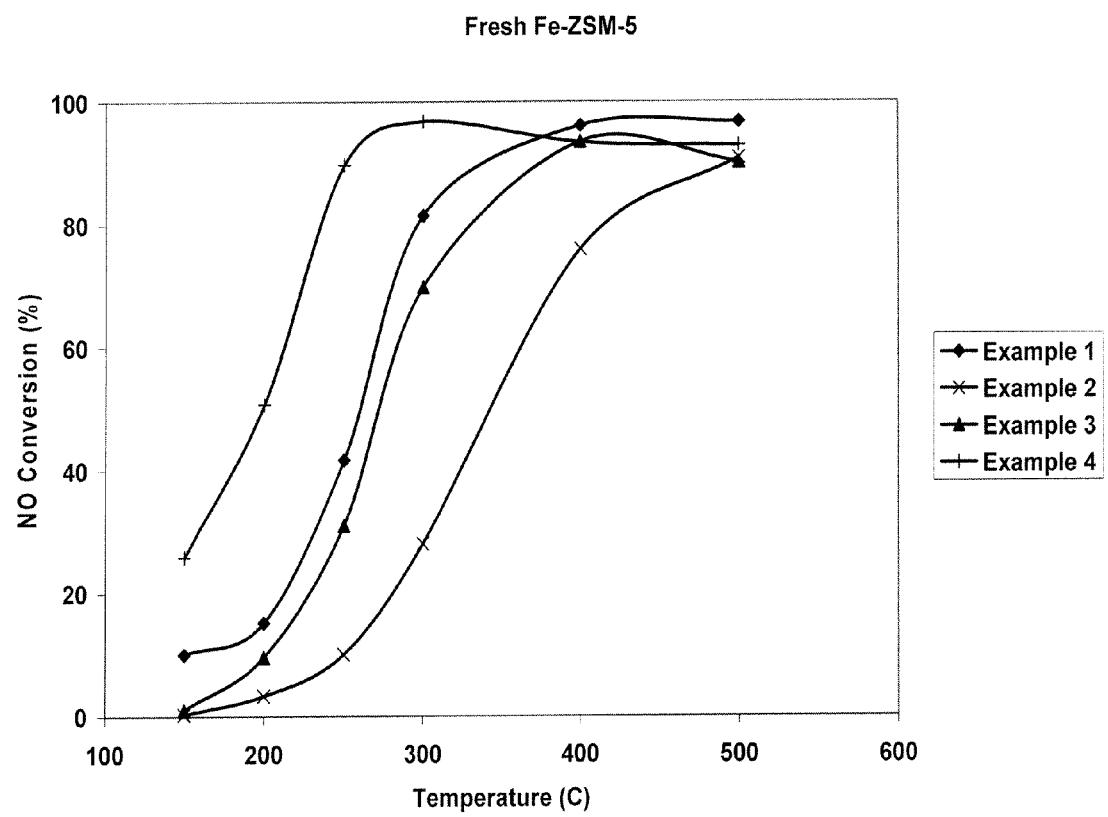
FIG. 1. is a graph of catalytic behavior of various inventive and comparable fresh Fe-containing ZSM-5 materials in the selective catalytic reduction of $NO_x$.

Aside from the subject matter discussed above, the present disclosure includes a number of other exemplary features such as those explained hereinafter. It is to be understood that both the foregoing description and the following description are exemplary only.

DETAILED DESCRIPTION OF THE INVENTION

Zeolites are the aluminosilicate members of the family of microporous solids known as "molecular sieves". This phrase refers to the ability to selectively sort molecules based primarily on a size exclusion process, and is a function of the regular pore structure of molecular dimensions associated with zeolites. The maximum size of the molecular or ionic species that can enter the pores of a zeolite is controlled and defined by the diameters of the rings. For example, the term "10 ring" or more commonly "10R", refers to a closed loop that is built from 10 tetrahedrally coordinated silicon (or aluminium) atoms and 10 oxygen atoms. The pore openings for all rings of one size are generally not identical, due to various effects, including bond-induced strain. The present disclosure is directed to a variety of zeolites, including those encompassed by 8R to 18R zeolites, and methods of making those zeolites.

As stated, SCR is a valuable tool in the reduction of nitric oxides found in polluting gases. $NH_3$ storage is a central feature of $NH_3$-SCR (selective catalytic reduction of nitrogen oxides using $NH_3$) catalysts, because $NO_x$ ($NO+NO_2$) in exhaust gas can react with stored $NH_3$ in the absence of $NH_3$ in the feed. $NH_3$ storage sites help reduce ammonia slip and can also allow flexibility for the $NH_3$ dosing strategy. Framework Al-sites in zeolites are acidic and adsorb $NH_3$ readily and are thus suitable as $NH_3$ storage sites. The importance of acid sites for $NH_3$-SCR has been discussed in *Applied Catalysis B: Environmental*, vol. 66, pp. 208-216, 2006.

NO oxidation is an important step in the overall $NH_3$-SCR reaction, especially in cases where $NO_2$ is absent in the feed, i.e. when the $NO/NO_x$ ratio is close to unity. Fe-exchanged zeolites have been studied for $NH_3$-SCR, and NO oxidation has been suggested to be a key step for the reaction on these materials (*Applied Catalysis A: General*, vol. 235, pp. 241-251, 2002).

The iron-containing aluminosilicate zeolites described herein contain acid sites, framework iron, and exchangeable Fe-sites. Aluminum atoms in the zeolite framework create acid sites that are necessary for $NH_3$ storage for SCR reaction. Part of Fe is in the framework after synthesis and part of Fe will be present at exchange sites when the Fe content in the material is sufficiently high. Such iron-containing zeolite as fresh is active for $NH_3$-SCR reaction. The framework iron will migrate out of the framework during hydrothermal aging, and the framework Fe then becomes a source for providing additional Fe to exchange sites needed for SCR reaction. The novel iron-containing zeolites are more durable for $NH_3$-SCR reaction upon hydrothermal aging or in a practical use than a conventional Fe-exchanged zeolite or Fe-silicate without aluminum.

In one embodiment, there is disclosed an iron-containing aluminosilicate zeolite, wherein the structure of the zeolite has both framework iron and iron cations on the ion-exchange sites. The phrase "framework iron" (or any version thereof) refers to iron cations present in the framework of an aluminosilicate zeolite to balance the negative charge of the zeolite. Framework iron is inactive and generally the result of direct synthesis, not ion-exchange or impregnation. The phrase "iron cations on ion-exhange sites" (or any version thereof) refers to iron cations that are not in the zeolite framework and are active for $NO_x$ reduction. Iron cations on ion-exhange sites may result from ion-exchange or, as in the present case, may also result from direct synthesis.

The inventors have discovered the product according to the present disclosure wherein the structure of the zeolite has both framework iron and iron cations on the ion-exchange sites. Therefore, the zeolites of the present invention are active even in the absence of an activation step and they remain active after exposure to steam and/or heat.

In another embodiment, there is disclosed a method of making iron-containing aluminosilicate zeolites that is based on the ability to add an iron constituent during the synthesis step of the zeolite. The phrase "direct synthesis" (or any version thereof) refers to a method that does not require a metal-doping process after the zeolite has been formed, such as a subsequent ion-exchange or impregnation method. The Inventors have discovered that the direct synthesis method according to the present disclosure makes it easier to control the amount of iron in the zeolite than traditional ion-exchange and impregnation methods. Thus, not only is the disclosed method simpler than traditional methods, but it produces a better final product since the iron content can be more accurately controlled. Moreover, in at least one aspect of the present invention, the method does not require an additional step to extract the transition metal from the zeolite framework, such as steam treatment, as active iron is already present in the zeolite.

In addition, the iron-containing aluminosilicate zeolites made according to the present disclosure are hydrothermally stable. As used herein "hydrothermally stable" refers to the ability to retain at least some catalytic activity under high temperature conditions of use, such as under traditional driving conditions of an automobile. In one embodiment, zeolites made according to the present disclosure are hydrothermally stable at 700° C. for 16 hours.

In another embodiment, the resulting iron-containing aluminosilicate zeolite is hydrothermally stable in the presence of sulfur compounds since sulfur or sulfur compounds are typically found in exhaust gases of coal-fired power plants and of turbines or other engines fueled with sulfur-containing fuels, such as fuel oils and the like.

As stated, there is disclosed a method of making a iron-containing aluminosilicate zeolite that comprises adding an iron constituent during synthesis of the zeolite. In one embodiment, the direct addition of the iron constituent enables the synthesis of an aluminosilicate zeolite with at least 0.2% by weight, and more typically from 1.0 to 5.0% by weight of iron, such as Fe2+ and Fe3+.

Prior to the present invention, adding these amounts of iron to zeolites were primarily done via ion-exchange or impregnation, after the zeolite was calcined to form a final product. As stated, the inventive method adds the iron constituent during the synthesis process, and not on the finished zeolite, e.g., not after calcination. The present invention also does not require an additional step to extract the transition metal from the zeolite framework, such as steam treatment. Thus, another benefit of the present invention is that it enables the inventive material to be coated on a monolithic substrate and the entire substrate be calcined.

As stated, the iron-containing aluminosilicate zeolite described herein is made via a direct synthesis process. However, it is possible to include additional iron cations and/or at least one additional metal cation on the ion-exchange sites via an ion-exchange process. In one embodiment, the at least one additional metal is chosen from copper, manganese, cobalt, and silver.

The iron-containing aluminosilicate zeolite described herein may exhibit a selective catalytic reduction of nitrogen oxides with $NH_3$ or urea of greater than 40% conversion at temperatures at 250-300° C. in exhaust gases prior to aging or exposure to steam.

In one embodiment, the iron-containing aluminosilicate zeolite described herein exhibits a selective catalytic reduction of nitrogen oxides with $NH_3$ or urea of greater than 80% conversion at temperatures between 300° C. and 500° C. in exhaust gases after hydrothermal aging or exposure to steam.

There is also disclosed a direct synthesis method of making an iron-containing aluminosilicate zeolite that comprises:

mixing a source of alumina, a source of silica, optionally a structural directing agent, with an iron constituent to form an iron containing synthesis mixture; and performing at least one heating step on the iron containing synthesis mixture to form an iron-containing aluminosilicate zeolite wherein the structure of the zeolite has both framework iron and iron cations on the ion-exchange sites.

Generally, the present method is directed to making by direct synthesis any type of iron-containing aluminosilicate zeolite by mixing a source of alumina, a source of silica, a source of iron, and optionally with a structural directing agent to directly synthesize iron-containing aluminosilicate zeolites. Depending on the desired zeolite product, such as a Beta, ZSM-5 or Y-type zeolite, the use of structural directing agent could vary. For example, in one embodiment, there is disclosed a method of making iron-Beta zeolites by mixing the sources of alumina, silica and iron with water and an organic structural directing agent, such as tetraethylammonium hydroxide (TEAOH).

In a different embodiment, there is disclosed a method of making a ZSM-5 zeolite without the use of an organic structural directing agent.

Non-limiting examples of sources of alumina that may be used in the present disclosure include sodium aluminate, aluminum hydroxide, alumina, aluminum nitrate, and aluminum sulfate. The method may comprise an additional step of removing any residual sodium from the product. This is typically done via an ion-exchange process with known salts or the like, including ammonium salts of Cl, $SO_4$, $NO_3$. In one embodiment, residual sodium is removed prior to calcining by slurrying the product in a desired salt, such as $NH_4NO_3$.

The source of iron is typically an iron salt is chosen from ferric nitrate, ferric chloride, ferrous chloride, and ferrous sulfate. . In addition, the source of silica may comprise a silica sol, which is typically added under vigorous stirring conditions. Non-limiting examples of other sources of silica that might be used include known silicates, such as sodium silicate, and sodium metalsilicate, as well as colloidal silica, silica gel, precipitated silica, silica-alumina, and the like.

After formation of the gel, a zeolite source, such as a beta-zeolite and ZSM-5, is optionally added in the form of crystallization seeds. When used, the crystallization seeds are added in amounts ranging from 0.1 to 5.0% by weight.

Next, the gel is heated to form a product. Heating of the gel may be performed in an autoclave at a temperature ranging from 140° C. to 250° C. for a time ranging from 4-72 hours, such as 24-48 hours. The treatment temperature may be lowered when a zeolite-Y is synthesized. For example, the temperature may range from 80 to 105° C., if a Y-type zeolite is formed.

After cooling and optionally performing at least one treatment process on the product chosen from filtering, washing and drying, it is eventually calcined to form an iron-containing aluminosilicate zeolite containing at least 0.2%, such as from 1.0% to 5.0% by weight of $Fe^{2+}$ or $Fe^{3+}$. As explained in more detail below, the calcination step may be performed after the inventive iron-containing aluminosilicate zeolite is coated on a monolith.

In one embodiment, the product is further subject to an ion-exchange and/or impregnation step to increase the amount of iron or add at least one additional metal, such as copper, manganese, cobalt, and silver.

In another embodiment, there is disclosed a hydrothermally stable iron-containing aluminosilicate zeolite made according to previously described method, including one containing at least 0.2% by weight of $Fe^{2+}$ or $Fe^{3+}$ made by a direct synthesis method.

The iron-containing aluminosilicate zeolite described herein typically has a silica to alumina ratio of 5 to 100, or less than 60, or even 5-50, depending on the type of zeolite. For example, a Y-type zeolite typically has a silica to alumina ratio of 5 to 40, a beta-zeolite has a silica to alumina ratio of 10-80, and a ZSM-5 zeolite has a silica to alumina ratio of 15 to 100.

In addition to the inventive method of making and the inventive iron-containing aluminosilicate zeolite, there is disclosed a method of using the disclosed iron-containing aluminosilicate zeolite. For example, a typical exhaust gas of a diesel engine contains from about 2 to 15 volume percent oxygen and from about 20 to 500 volume parts per million nitrogen oxides (normally comprising a mixture of NO and $NO_2$). The reduction of nitrogen oxides with ammonia to form nitrogen and $H_2O$ can be catalyzed by metal-promoted zeolites, hence the process is often referred to as the "selective" catalytic reduction ("SCR") of nitrogen oxides.

Thus, in one embodiment there is also disclosed a method of SCR of nitrogen oxides in exhaust gases which comprises at least partially contacting an exhaust gas with the iron-containing aluminosilicate zeolite disclosed herein.

In order to reduce the emissions of nitrogen oxides various exhaust gases, ammonia is typically added to the gaseous stream containing the nitrogen oxides. In one embodiment of the present invention, ammonia is used to allow the gaseous stream, when contacted with the inventive ferrialuminosilicate zeolite at elevated temperatures, to catalyze the reduction of nitrogen oxides.

In one embodiment, a urea solution may be used to provide the ammonia to the gaseous stream. This is particularly true when used in automotive exhaust treatment applications and stationary $NO_x$ reduction applications.

Non-limiting examples of the types of exhaust gases that may be treated with the disclosed zeolites include both automotive exhaust, from on and off road vehicles, including diesel engines. In addition, exhaust from stationary sources, such as power plants, stationary diesel engines, and coal-fired plants, may be treated. Thus, there are also disclosed methods of treating exhaust emissions, such as automotive exhaust or exhaust from stationary sources.

The iron-containing aluminosilicate zeolite of the present invention may be provided in the form of a fine powder which is admixed with or coated by a suitable refractory binder, such as alumina, bentonite, silica, or silica-alumina, and formed into a slurry which is deposited upon a suitable refractory substrate. In one embodiment, the carrier substrate may be "honeycomb" structure. Such carriers are well known in the art as having a many fine, parallel gas flow passages extending therethrough. One non-limiting examples of the material used to make the honeycomb structure comprises cordierite, mullite, silicon carbide, alumina, titania, zirconia, silica, alumina-silica, alumina-zirconia, stainless steel, Fe—Cr—Al alloy and the combinations thereof.

There is also disclosed a method of making a monolith coated with an uncalcined iron-containing aluminosilicate zeolite. As the inventive method does not require ion-exchange to be performed on a calcined structure, it is possible to coat a monolith with an uncalcined zeolite described herein, and calcine the entire coated structure. This would be beneficial in that it would further ease the processing steps of the zeolite manufacturer.

This method would comprise mixing a source of alumina, a source of silica, and a structural directing agent with an iron constituent to form an iron containing product and performing at least one heating step on the iron containing product to form a iron-containing aluminosilicate zeolite having at least 0.2%, such as an amount ranging from 1 to 5% by weight of Fe2+ or Fe3+. Once the washcoat or uncalcined zeolite is made, it can be directly coated onto a monolith. The entire coated monolith could then be calcined to remove the structural directing agent.

In another embodiment, the iron-containing aluminosilicate zeolite may be provided in discrete forms (as opposed to a coating on a substrate). Non-limiting examples of such forms include pellets, tablets or particles of any other suitable shape, for use in a packed bed, for example. The iron-containing aluminosilicate zeolite according to the present invention may also be formed into shaped pieces such as plates, tubes, or the like.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention will be further clarified by the following non-limiting examples, which are intended to be purely exemplary of the invention.

EXAMPLES

Example 1

Fe-containing ZSM-5 (2.2% Fe, SAR=31) by Direct-synthesis Without Organic Structure Direction Agent 550 grams of sodium silicate solution (28% $SiO_2$, 9% $Na_2O$), 24.6 grams of $Fe(NO_3)_3 \cdot 9H_2O$, and 540 grams of de-ionized water ($DI-H_2O$) were mixed together. A solution consisting of 46 grams of $Al_2(SO_4)_3 \cdot 18H_2O$, 21 grams of $H_2SO_4$ (96%) and 250 grams of $DI-H_2O$ was slowly added to the mixture with vigorous stirring. Finally 3.0 grams of ZSM-5 zeolite was added to the synthesis gel as crystallization seeds. The gel had the following molar composition.

33 $SiO_2$:1.0 $Al_2O_3$:0.4 $Fe_2O_3$:10 $Na_2O$:825 $H_2O$

The gel was loaded into a 2-liter autoclave and heated to 185° C. for 24 hours. After cooling, the product was recovered by filtration and washing. X-ray diffraction pattern of the product showed pure-phase ZSM-5 zeolite.

To remove residual sodium, the solid was slurried in a 3 M $NH_4NO_3$ solution and stirred at 80° C. for 2 hours. After filtering, washing, and drying, the final product had silica-to-alumina ratio (SAR) of 31 and 2.2 wt. % Fe. The BET surface area of the product was 404 m²/g and micropore volume was 0.14 cc/g.

Example 2

(Comparable) Fe-Containing ZSM-5 (0.6 wt. % Fe, SAR=88) Prepared in Presence of Organic Structure Directing Agent This comparable synthesis was made following the procedure described in Journal of Catalysis, vol. 195, pp. 287-297, 2000 and Example 1 of U.S. Patent Application 2006/0088469 A1.

9.6 grams of NaOH pellets (98 wt. %) was dissolved in 817 grams of $DI-H_2O$, and then 61.0 grams of tetrapropylammonium hydroxide solution (TPAOH, 40 wt. %) was added. 250 grams of tetraethyl orthosilicate (TEOS) was mixed in the above solution. Finally a solution containing 9.0 grams of $Al(NO_3)_3 \cdot 9H_2O$, 2.8 grams of $Fe(NO_3)_3 \cdot 9H_2O$, and 155 grams of $DI-H_2O$ was slowly added with vigorous stirring. The final mixture had the following molar composition.

100 $SiO_2$:1.0 $Al_2O_3$:0.3 $Fe_2O_3$:9.8 $Na_2O$:4500 $H_2O$

The mixture was stirred for 30 minutes and then transferred to a 2-liter autoclave and heated to 175° C. without agitation. Crystalline ZSM-5 was obtained after 2 days with identical crystal morphology shown in Journal of Catalysis, vol. 195, pp. 287-297, 2000. The solid was filtered, washed, and dried in the oven. The solid was then calcined at 550° C. for 10 hours to remove the organic agent. To remove residual sodium, the calcined material was slurried in a 2 M $NH_4NO_3$ solution and stirred at 80° C. for 2 hours. After filtering, washing, and drying, the final product had SAR of 88 and 0.58 wt. % Fe. The BET surface area of the calcined product was 432 m²/g and micropore volume was 0.15 cc/g.

Example 3

(Comparable) Fe-containing ZSM-5 (3% Fe, No Aluminum) Prepared in Presence of Organic Structure Direction Agent This comparable synthesis without aluminum was following the procedure described in the Example 1 of U.S. Pat. No. 4,952,385.

550 grams of sodium silicate (28.2 wt. % $SiO_2$, 8.9 wt % $Na_2O$) from PQ Corporation was mixed in 550 grams of $DI-H_2O$. Then a solution containing 22.7 grams of $Fe(NO_3)_3 \cdot 9H_2O$ and 442 grams of $DI-H_2O$ was added. 41.0 grams of $H_2SO_4$ (96 wt. %) was slowly added into the mixture with vigorous stirring. Finally 139 grams of tetrapropylammonium bromide solution (TPABr, 35 wt. %) was added. The final mixture had the following molar composition.

92 $SiO_2$:1.0 $Fe_2O_3$:27.9 $Na_2O$:14.4 $H_2SO_4$:2852 $H_2O$

The mixture was transferred to a 2-liter autoclave and heated to 170° C. for 6 days without agitation. The solid was filtered, washed, and dried in the oven. X-ray diffraction pattern showed the solid was a pure ZSM-5 phase. The solid was then calcined at 550° C. for 6 hours to remove the organic agent. To remove residual sodium, the calcined material was slurried in a 2 M $NH_4NO_3$ solution and stirred at 80° C. for 2 hours. After filtering, washing, and drying, the final product had a Si/Fe molar ratio of 39 and 2.3 wt. % Fe. The BET surface area of the calcined product was 427 $m^2/g$ and micropore volume was 0.14 cc/g.

Example 4

(Comparable) Fe-ZSM-5 (0.9 wt. % Fe, SAR=23) By Aqueous Ion-exchange

Commercial ZSM-5 zeolite from Zeolyst (CBV 2314) was ion-exchanged with an $FeSO_4$ solution at 80° C. for 2 hours. After filtering, washing and drying, the Fe-ZSM-5 product had 0.9 wt. % Fe, and BET surface area of 434 $m^2/g$.

Example 5

Fe-containing Zeolite Beta (1.1 wt. % Fe, SAR=24) By Direct-synthesis 340 grams of tetraethylammonium hydroxide solution (35% TEAOH), 114 grams of sodium aluminate solution (23.5% $Al_2O_3$ and 19.6% $Na_2O$), and 45 grams of de-ionized water were mixed together. To this solution, 32 grams of $Fe(NO_3)_3.9H_2O$ were added. 1000 grams of sodium stabilized silica sol (40% silica) were added to the above mixture under vigorous stirring. Finally 15 grams of Beta zeolite was added to the synthesis gel as crystallization seeds. The gel has the following molar composition.

25.7 $SiO_2$:1.0 $Al_2O_3$:0.15 $Fe_2O_3$:1.7 $Na_2O$:3.1 TEAOH:198 $H_2O$

The gel was loaded into a 2 liter autoclave and heated to 160° C. for 2 days. After cooling, the product was recovered by filtration and washing. X-ray diffraction pattern of the product showed pure-phase Beta zeolite.

To remove residual sodium, the product was then slurried in a 2 M $NH_4NO_3$ solution and stirred at 80° C. for 2 hours. After filtering, washing, and drying, the product was calcined at 550° C. for 10 hours. The final product had silica-to-alumina ratio (SAR) of 24 and 1.1 wt. % Fe. The BET surface area of the calcined product was 728 $m^2/g$ and micropore volume was 0.20 cc/g.

Example 6

Fe-containing Zeolite Beta (1.5 wt. % Fe, SAR=25) By Direct-synthesis

The synthesis procedures of Example 5 were repeated except that the amount of $Fe(NO_3)_3.9H_2O$ added was 43.5 grams. The gel composition is:

25.7 $SiO_2$:1.0 $Al_2O_3$:0.21 $Fe_2O_3$:1.7 $Na_2O$:3.1 TEAOH:198 $H_2O$

After contacting with $NH_4NO_3$ solution and calcination, the final product had SAR of 25 and 1.5 wt. % Fe. The BET surface area of the calcined product was 718 $m^2/g$ and micropore volume was 0.20 cc/g.

Example 7

(Comparable) Fe-Beta (1.0 wt. % Fe, SAR=25) By Aqueous Ion-exchange

Commercial Beta zeolite from Zeolyst (CP 814E, SAR=25) was ion-exchanged with $FeCl_2$ solution at 80° C. for 2 hours. After filtering, washing and drying, the Fe-Beta product had 1.0 wt. % Fe and BET surface area of 698 $m^2/g$.

Example 8

Fe-containing High-Silica Chabazite (1.1% Fe, SAR=34) By Direct-synthesis 584 grams of N,N,N-Trimethyl-1-adamantammonium hydroxide solution (TMAAOH, 13 wt.%) were mixed with 516 grams of de-ionized water. Then 18.2 grams of NaOH and 11.3 grams of alumina (53 wt. % $Al_2O_3$) were added. To this mixture, 10.5 grams of $Fe(NO_3)_3.9H_2O$ were added. 150 grams of dried silica gel (~90% silica) were added to the above mixture under vigorous stirring. Finally 3 grams of chabazite zeolite was added to the synthesis gel as crystallization seeds. The gel has the following molar composition.

40.0 $SiO_2$:1.0 $Al_2O_3$:0.22 $Fe_2O_3$:3.8 $Na_2O$:6.0 TMAAOH:1000 $H_2O$

The gel was loaded into an autoclave and heated to 160° C. for 96 hours. After cooling, the product was recovered by filtration and washing. X-ray diffraction pattern of the product showed pure-phase chabazite zeolite (CHA).

The product was calcined at 550° C. for 10 hours. To remove residual sodium, the product was then slurried in a 2 M $NH_4NO_3$ solution and stirred at 80° C. for 2 hours. After filtering, washing, and drying, the final product had silica-to-alumina ratio (SAR) of 34 and 1.1 wt. % Fe. The BET surface area of the product was 817 $m^2/g$ and micropore volume was 0.30 cc/g.

$NH_3$-SCR of $NO_x$ With Ferrialuminosilicate Zeolites

The activities of Fe-containing zeolites for $NO_x$ conversion using $NH_3$ as reductant were evaluated in a flow-through type reactor. Powder zeolite samples were pressed and sieved to 35/70 mesh and loaded into a quartz tube reactor. The gas stream contained 500 ppm NO, 500 ppm $NH_3$, 5% $O_2$, and balance $N_2$. The hourly space velocity for all reactions was 50,000 $h^{-1}$. Reactor temperature was ramped and $NO_x$ conversion was determined with an infrared analyzer at each temperature interval. The results are shown in FIGS. 1-4.

FIG. 1 compares SCR of $NO_x$ with $NH_3$ on fresh Fe-containing ZSM-5 materials made in Examples 1-4 above. The samples from comparable Example 2 having low Fe content and high SAR (88) and Example 3 having no aluminum show much lower activity than the sample from inventive Example 1 having high Fe-content and low SAR (31). Example 4, which is Fe-ZSM-5 made by Fe-exchange, shows the highest activity.

Figure 2:
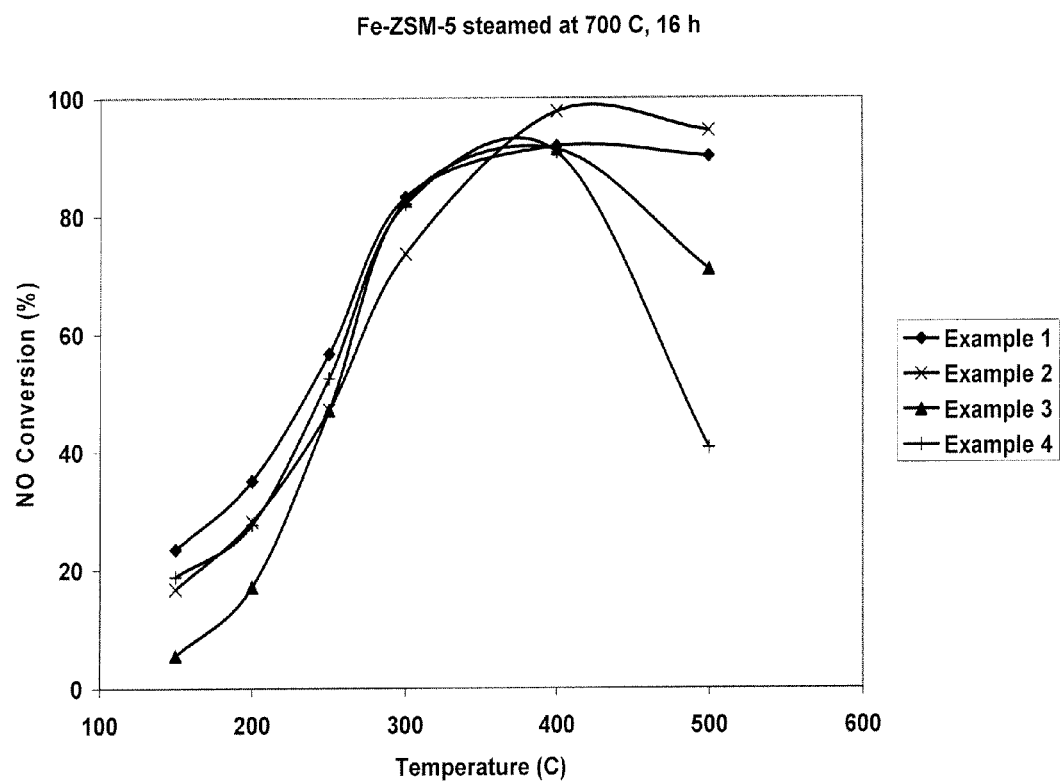
FIG. 2. is a graph of catalytic behavior of various inventive and comparable hydrothermally aged Fe-containing ZSM-5 in the selective catalytic reduction of $NO_x$.

FIG. 2 compares SCR of $NO_x$ with $NH_3$ on Fe-containing ZSM-5 materials made by Examples 1-4 above and hydrothermally aged at 700° C. for 16 hours in 10% by volume of water vapor. The sample from Example 1 shows the highest activity in the low temperature region and also has stable activity in the high temperature region.

Figure 3:
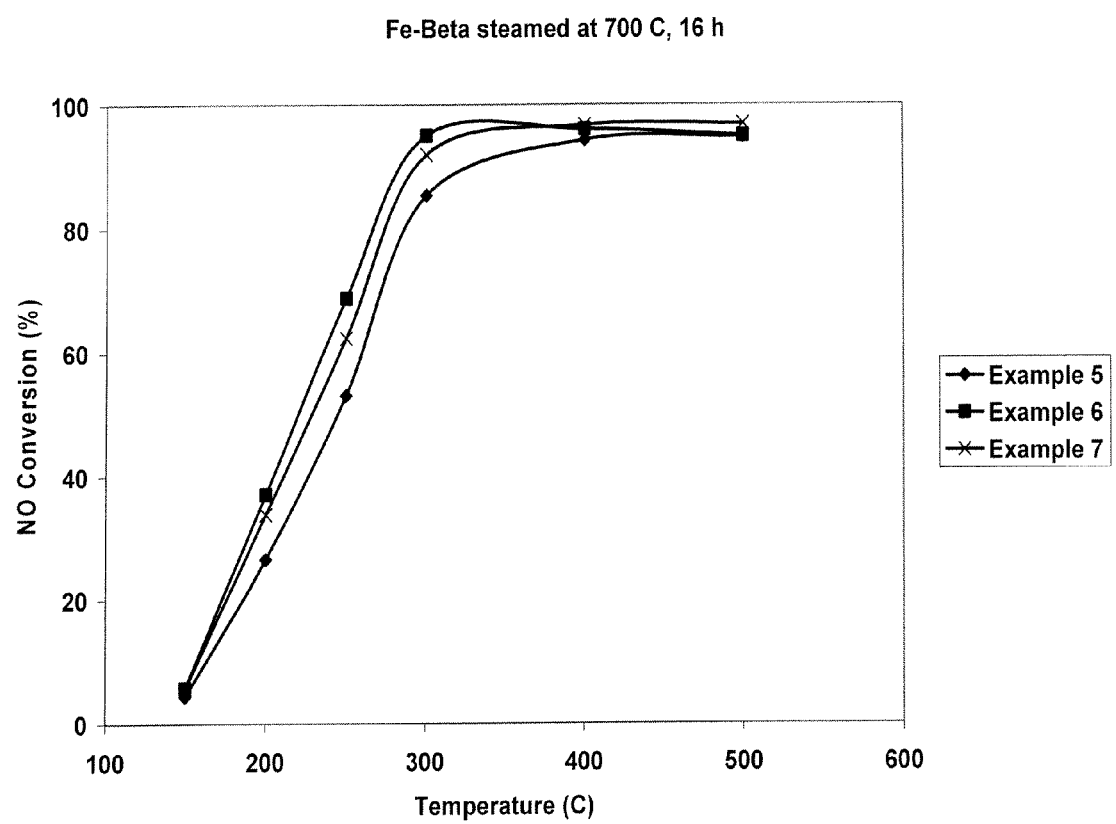
FIG. 3. is a graph of catalytic behavior of various inventive and comparable hydrothermally aged Fe-beta materials in the selective catalytic reduction of $NO_x$.

FIG. 3 compares SCR of NOx conversion with NH3 on Fe-Beta materials made by Examples 5-7 above and hydrothermally aged at 700° C. for 16 hours in 10% by volume of water vapor.

Figure 4:
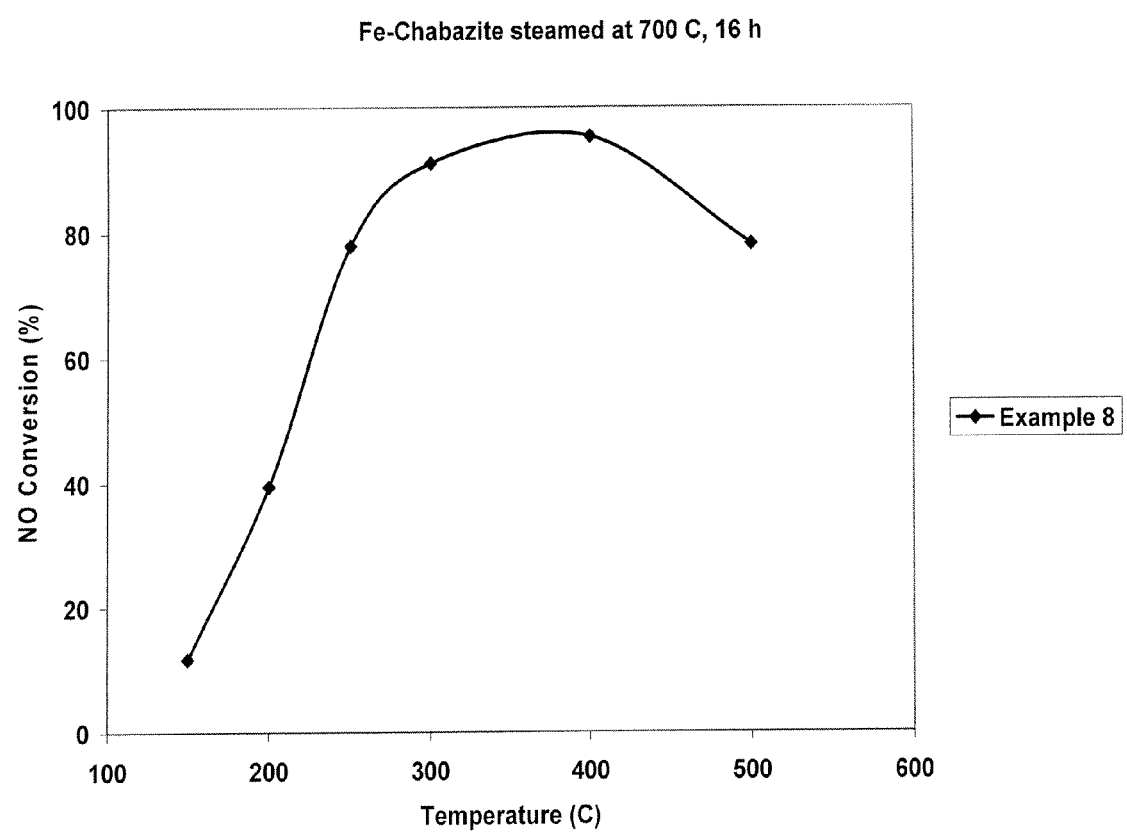
FIG. 4. is a graph of catalytic behavior of hydrothermally aged Fe-chabazite in the selective catalytic reduction of $NO_x$.

FIG. 4 shows SCR of NOx conversion with NH3 on an Fe-chabazite material made by Example 8 above and hydrothermally aged at 700° C. for 16 hours in 10% by volume of water vapor.

Figure 5:
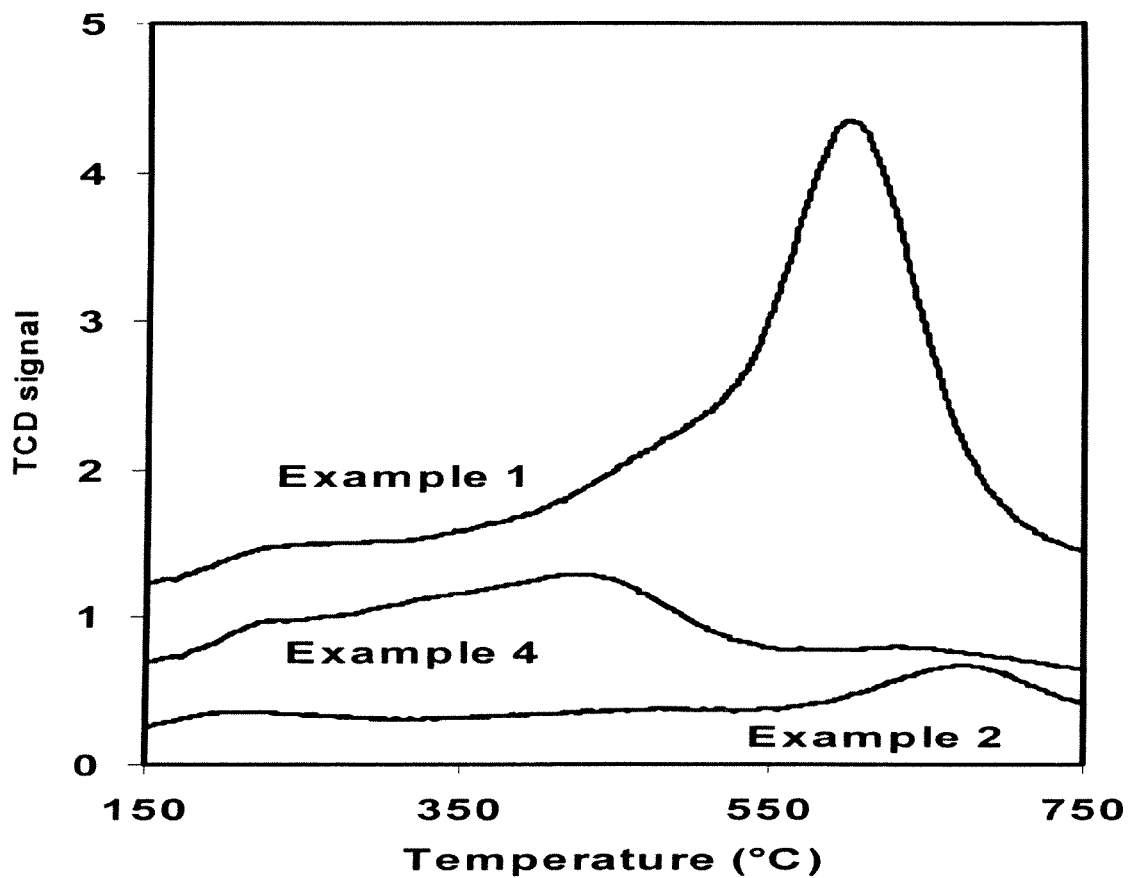
FIG. 5. is a graph of Hydrogen Temperature-programmed reduction ($H_2$-TPR) profiles for fresh samples of Example 1, 2 and 4.

FIG. 5 shows a Hydrogen Temperature-programmed reduction ($H_2$-TPR) profiles for fresh samples of Example 1, 2 and 4. [Ramping rate: 10° C./min. Gas: 15 cc/min 5% $H_2$/Ar. The $H_2$ consumption was measured using a thermal conductivity detector.]

Peaks in the 550-700° C. region correspond to framework iron, whereas the 300-500° C. region correspond to exchanged Fe cations. Example 4 made by an exchange process contains exchanged Fe but no framework Fe and has peaks in the 300-500° C. region corresponding to reduction of exchanged trivalent Fe to divalent Fe. Example 2 shows no evidence of exchanged Fe, but only framework Fe with a reduction peak around 650° C. Fresh sample of Example 1 contains framework Fe (peak ~600° C.) and a shoulder at 450-500° C. corresponding to Fe on the exchange sits. The samples with larger amounts of iron on exchange sites are more active for $NH_3$-SCR of NO (see FIG. 1).

What we claim is:

1. A method of selective catalytic reduction of nitrogen oxides in exhaust gases, said method comprising:
at least partially contacting said exhaust gases with an iron-containing aluminosilicate zeolite, chosen from Beta, Y, mordenite, ferrierite and chabazite type zeolites, comprising both framework iron and extra-framework iron cations, wherein said zeolite has a silica-to-alumina ratio (SAR) of less than 60.

2. The method of claim 1, wherein said selective catalytic reduction occurs in the presence of ammonia, urea, or sources thereof.

3. The method of claim 1, wherein said iron is present in an amount ranging from 1 to 5% by weight of said zeolite.

4. The method of claim 1, wherein said selective catalytic reduction of nitrogen oxides improves after hydrothermal aging said zeolite at 300° C. or higher.

5. The method of claim 1, wherein said exhaust gas is automotive exhaust.

6. The method of claim 1, wherein said exhaust gas is from a stationary source chosen from a power generation plant or a stationary diesel engine.

7. A method of selective catalytic reduction of nitrogen oxides in exhaust gases, said method comprising:
at least partially contacting said exhaust gases with an iron-containing aluminosilicate zeolite, chosen from Beta, Y, mordenite, ferrierite and chabazite type zeolites, comprising both framework iron and extra-framework iron cations, wherein said method exhibits a selective catalytic reduction of nitrogen oxides with $NH_3$ or urea of greater than 40% conversion at 250-300 ° C. in exhaust gases prior to aging or exposure to steam.

8. The method of claim 7, wherein said iron is present in an amount ranging from 1 to 5% by weight of said zeolite.

9. The method of claim 7, wherein said selective catalytic reduction of nitrogen oxides improves after hydrothermal aging said zeolite at 300 ° C. or higher.

10. The method of claim 7, wherein said zeolite has a silica-to-alumina ratio (SAR) of less than 60.

11. The method of claim 7, wherein said exhaust gas is automotive exhaust.

12. The method of claim 7, wherein said exhaust gas is from a stationary source chosen from a power generation plant or a stationary diesel engine.

13. A method of selective catalytic reduction of nitrogen oxides in exhaust gases, said method comprising:
at least partially contacting said exhaust gases with an iron-containing aluminosilicate zeolite, chosen from Beta, Y, mordenite, ferrierite and chabazite type zeolites, comprising both framework iron and extra-framework iron cations,
wherein said zeolite has a silica-to-alumina ratio (SAR) of less than 60, and exhibits a selective catalytic reduction of nitrogen oxides with $NH_3$ or urea of greater than 40% conversion at 250-300 ° C. in exhaust gases prior to aging or exposure to steam.

14. The method of claim 13, wherein said iron is present in an amount ranging from 1 to 5% by weight of said zeolite.

15. The method of claim 13, wherein said selective catalytic reduction of nitrogen oxides improves after hydrothermal aging said zeolite at 300 ° C. or higher.

16. The method of claim 1, wherein said exhaust gas is automotive exhaust, or said exhaust gas is chosen from a stationary source including a power generation plant or a stationary diesel engine.

* * * * *